United States Patent
Bechtold et al.

(10) Patent No.: US 10,245,633 B2
(45) Date of Patent: Apr. 2, 2019

(54) MACHINING PLATE-LIKE WORKPIECES

(71) Applicant: TRUMPF Werkzeugmaschinen GmbH + Co. KG, Ditzingen (DE)

(72) Inventors: Martin Bechtold, Gemmrigheim (DE); Heinz Brillert, Gammertingen (DE)

(73) Assignee: TRUMPF Werkzeugmaschinen GmbH + Co. KG, Ditzingen (DE)

( * ) Notice: Subject to any disclaimer, the term of this patent is extended or adjusted under 35 U.S.C. 154(b) by 107 days.

(21) Appl. No.: 15/351,671

(22) Filed: Nov. 15, 2016

(65) Prior Publication Data
US 2017/0056950 A1 Mar. 2, 2017

Related U.S. Application Data

(63) Continuation of application No. PCT/EP2015/060212, filed on May 8, 2015.

(30) Foreign Application Priority Data

May 19, 2014 (DE) .......... 10 2014 209 393

(51) Int. Cl.
*B21D 28/00* (2006.01)
*B21D 28/26* (2006.01)
(Continued)

(52) U.S. Cl.
CPC .......... *B21D 28/265* (2013.01); *B23P 19/062* (2013.01); *B44B 5/0052* (2013.01)

(58) Field of Classification Search
CPC ........ G05B 19/408; B21J 15/10; B21D 28/24; B21D 28/243; B21D 28/246; B21D 28/26; B21D 28/265; B23P 19/062; B44B 5/0052
See application file for complete search history.

(56) References Cited

U.S. PATENT DOCUMENTS

| 241,372 | A | * | 5/1881 | Wales | ............... B65G 59/02 221/210 |
| 2,282,711 | A | * | 5/1942 | Eklund | ............ F16B 19/1063 29/432 |

(Continued)

FOREIGN PATENT DOCUMENTS

| DE | 0338117 T1 | 4/1995 |
| DE | 10049701 A1 | 7/2001 |

(Continued)

OTHER PUBLICATIONS

English Translation of JP 11-028516.*
International Search Report for corresponding PCT Application No. PCT/EP2015/060212, dated Aug. 3, 2015, 4 pages.

*Primary Examiner* — Stephen Choi
(74) *Attorney, Agent, or Firm* — Fish & Richardson P.C.

(57) ABSTRACT

A method for machining a plate-like workpiece with a processing machine includes forming a receptacle in the plate-like workpiece for an insert part and machining the receptacle based on one or both of an orientation at which the insert part is to be inserted into the receptacle and a side of the plate-like workpiece from which the insert part is to be inserted into the receptacle. The method further includes running a machining program to carry out the forming and the machining of the receptacle. A computer program product is provided to configure a programming system by which the machining program is generated.

10 Claims, 2 Drawing Sheets

(51) Int. Cl.
*B23P 19/06* (2006.01)
*B44B 5/00* (2006.01)

(56) References Cited

U.S. PATENT DOCUMENTS

| | | | | |
|---|---|---|---|---|
| 2,325,405 | A * | 7/1943 | Walter | B21D 28/265 |
| | | | | 408/91 |
| 2,378,603 | A * | 6/1945 | Wales | B21D 28/26 |
| | | | | 83/132 |
| 2,410,372 | A * | 10/1946 | Wales | B21D 28/24 |
| | | | | 76/107.1 |
| 4,819,324 | A * | 4/1989 | Roberts | B23P 19/04 |
| | | | | 29/771 |
| 5,682,657 | A * | 11/1997 | Hirose | B21D 28/12 |
| | | | | 101/3.1 |
| 7,168,364 | B2 | 1/2007 | Schneider | |
| 8,001,877 | B2 | 8/2011 | Schmidt et al. | |
| 2005/0251283 | A1 * | 11/2005 | Shovan | G05B 19/4099 |
| | | | | 700/145 |
| 2009/0217506 | A1 | 9/2009 | Schmidt | |
| 2010/0218906 | A1 * | 9/2010 | Marzilli | A47H 1/104 |
| | | | | 160/368.1 |
| 2011/0308294 | A1 | 12/2011 | Erlenmaier | |

FOREIGN PATENT DOCUMENTS

| | | |
|---|---|---|
| DE | 69829255 T2 | 1/2005 |
| DE | 102005056378 A1 | 5/2007 |
| DE | 202008014886 U1 | 5/2010 |
| DE | 112004001484 B4 | 3/2011 |
| EP | 0338117 | 10/1989 |
| EP | 0716363 A2 | 6/1996 |
| EP | 0917920 A2 | 5/1999 |
| EP | 1502673 A1 | 2/2005 |
| EP | 2198989 A1 | 6/2010 |
| EP | 2522456 A1 | 11/2012 |
| JP | 06179021 A | 6/1994 |
| JP | 11028516 A | 2/1999 |
| WO | WO2005016694 A2 | 2/2005 |

* cited by examiner

MACHINING PLATE-LIKE WORKPIECES

CROSS-REFERENCE TO RELATED APPLICATIONS

This application is a continuation of and claims priority under 35 U.S.C. § 120 to PCT Application No. PCT/EP2015/060212 filed on May 8, 2015, which claims priority to German Application No. DE 10 2014 209 393.7, filed on May 19, 2014. The entire contents of these priority applications are incorporated herein by reference.

TECHNICAL FIELD

The present disclosure relates to a method for machining a plate-like workpiece (e.g., a sheet metal plate) with a processing machine (e.g., a punching/forming machine), where multiple receptacles for insert parts (e.g., weld nuts and rivet nuts) are produced in the plate-like workpiece.

BACKGROUND

Insert parts are used in large scope in sheet metal machining so as to incorporate forming threads in sheet metal plates. Receptacles are initially introduced into a sheet metal plate, and insert parts are inserted into the receptacles manually or by machine at a later time. Once the insert parts have been inserted, the insert parts may be welded to the sheet metal plate or riveted directly to the sheet metal plate upon insertion. Errors may occur when the insert parts are later inserted in the receptacles.

SUMMARY

In the present disclosure, receptacles are produced in sheet metal plates for insert parts that are later inserted from one side of a sheet metal plate, and receptacles are produced in metal sheet plates for insert parts that are inserted from the other side of the sheet metal plate.

In some embodiments, the present disclosure provides a method for machining a plate-like workpiece. The workpiece is prepared to accommodate insertion of insert parts, which enhances a process reliability of the insertion procedure.

For example, a processing machine produces multiple receptacles in the workpiece for the insert parts. In order for errors to be avoided during later insertion of the insert parts, the processing machine machines the receptacles based on how the insert parts are to be oriented in the receptacles, and/or on which workpiece side the insert parts are later to be inserted from into the receptacles.

In temporal terms, this machining may be carried out prior to, during, and post incorporation of the receptacles into the workpiece. However, in some examples, producing a receptacle and machining of the receptacle based on an orientation and an insertion direction are separate machining steps. In some examples, receptacles are suitable for inserting assigned insert parts without machining, depending on orientations and insertion directions. Additional machining may be carried out to render the receptacles distinguishable from one another depending on the orientations and insertion directions of the insert parts.

The disclosed methods are particularly advantageous when the insertion parts are inserted into the workpiece during a later operation that occurs on another machining installation that is different from the processing machine. The advantages may be especially significant when the insert parts are inserted in a partially automatic manner, which is associated with a particularly high risk of inserting the insert parts in the wrong orientation and direction.

Additionally, a punching/forming machine that enables machining of plate-like workpieces (e.g., sheet metal plates) in an economical manner can serve as a processing machine. In some embodiments, the punching/forming machine may optionally include a laser machining unit in addition to a punching/forming unit. In some examples, the employment of a laser processing machine may also be advantageous without a punching/forming unit.

The disclosed method is particularly and practically relevant to receptacles that are formed to carry weld nuts and/or rivet nuts. These insert parts typically have a head portion that is to be disposed on a predefined workpiece side in an assigned receptacle after insertion. The insert parts, in this orientation, are fastened in the receptacles. Depending on the type of an insert part, the head portion may be welded or riveted. Errors with regard to the orientation of the insert parts are of particularly severe consequence in the case of these fixedly connected insert parts, since such insert parts cannot be readily removed from the receptacle to be inserted in the correct orientation. In some embodiments, machining of the receptacles is performed on that workpiece side from which assigned insert parts are to be inserted and/or on which the insert parts are to bear. Thus, machining of the receptacles results in an intuitive differentiation feature.

Additionally, it is advantageous for a plate-like workpiece to be horizontally disposed from the standpoint of workpiece handling. In order to avoid having to turn over the workpiece while still providing an intuitive differentiation feature for the receptacles, machining of the receptacles is performed on the workpiece upper side or the workpiece lower side, depending on how the insert part is later to be oriented in the receptacle, and/or on which workpiece side the insert part is later to be inserted from into the receptacle. Such machining provides a low effort, material-saving aspect for rendering the receptacles capable of differentiation based on the orientations and insertion directions of the insert parts.

In certain embodiments, the receptacles may alternatively or additionally be provided with an embossing, a chamfer, a shaping, and/or an interference contour on one side. In this way, it is conceivable for a depression (e.g., a hexagonal marking line 23 shown in FIG. 3) that encircles a receptacle (e.g., a receptacle 17 shown in FIG. 3) to be embossed on one workpiece side. The depression may be adapted to the shape of the head portion of the insert part (e.g., a hexagonal head portion of an insert part 25 shown in FIG. 3) to be later inserted such that a receptacle is additionally formed, but only on one workpiece side. Moreover, the depression may also define a rotary position of the head portion. An interference contour may be incorporated in the form of a nib or a ribbing on the periphery of the receptacles on one workpiece side. The interference contour later prevents the insert part from being inserted from this workpiece side, while insertion from the other side of the workpiece remains possible.

The identification of the receptacles via marking is particularly advantageous for machining sheet metal plates. For example, a marking is a permanent identification that cannot be unintentionally removed or tampered with. However, a colored identification or any other type of workpiece deformation may be substantially more discreet and susceptible to being readily covered by an optional later-applied coating of the plate-like workpiece. However, the methods disclosed herein can ensure that the ability to identify a receptacle at a later time does not compromise the visual appearance of the finished workpiece.

Producing a marking line in the workpiece is a particularly elegant manner of identification. In some examples, at least two marking lines are produced for each receptacle and enclose the receptacle therebetween. Accordingly, a reliable identification of the marked receptacle can occur via simple means. The receptacles are formed by apertures in the workpiece via the processing machine. A cost-effective method that has been proven in practice is for the apertures to be punched, such that simple cylindrical punched holes form the receptacles. Differentiating the receptacles based on an orientation and an insertion direction of an insert part to be later inserted is carried out by machining in a separate operating step.

The present disclosure relates to the implementation of the method in terms of control technology. Accordingly, the method is achieved via a machining program for operating a machine tool. The machining program has control commands by which the processing machine carries out the machining method when the machining program runs on a numerical control of the processing machine.

A further aspect of the present disclosure relates to a programming system that assists a programmer in generating and implementing such a machining program. In this context, the programming system may generate control commands based on predefined insertion directions and/or orientations of insert parts. By way of the control commands, the processing machine carries out machining of the assigned receptacles when the machining program runs on a numerical control of the processing machine.

The control commands are automatically generated by the programming system, such that the programmer does not have to write the control command himself or choose the control command from a list. Rather, it is sufficient for the programmer to predefine or select an identification of the receptacles and the respective insertion directions (e.g., from below or from above the workpiece) in an input module.

Regarding program and control technology, the programming system may advantageously generate mode-on control commands. During a later operation of the machine tool, the mode-on control commands set the numerical control of the processing machine to a mode in which machining of the receptacles depends on an orientation and an insertion direction according to a subsequent control command that indicates only a position of a receptacle for an insert part.

Multiple operating steps of the processing machine are triggered alone by a single position control command for carrying out machining based on the orientation and insertion direction. For example, the workpiece is positioned in relation to the machining tool, and the machining tool is activated. Machining based on the orientation and insertion direction (e.g., producing a marking line) requires continuous machining of the workpiece. For example, with the marking tool activated, the workpiece is displaced. The tool is subsequently activated. These steps are optionally repeated on a second workpiece area, such as to produce a second marking line.

In order for the mode to be exited again after carrying out the machining based on the orientation and insertion direction, the programming system may also generate mode-off control commands. In some embodiments, the mode-on control commands include parameters that relate to the workpiece side to be machined, the type and form of machining, and identification (e.g., marking). For example, a mode-on control command includes parameters such as "marking on top," length of a marking line, and spacing between a marking line and a receptacle. Additionally, the programming system may generate multiple control commands that solely identify receptacle positions on the workpiece following a mode-on control command. All receptacles for which the position has been listed are then subjected to machining using the same parameters during the later execution of the machining program.

A further aspect of the present disclosure relates to a computer program product that has coding means that are adapted for configuring a programming system when the computer program is operated on a data processing system. Finally, a further aspect of the present disclosure relates to a processing machine including a numerical control unit that may be set to a mode-on control command and then exit the mode-on control command according to a mode-off control command.

Other advantages may be found in the claims, the description, and the drawings. Likewise, the features mentioned above and those yet to be described below may be used independently or in any desired combination with one another. The embodiments shown and described are not to be understood as an exhaustive list, but rather are of an exemplary nature.

DETAILED DESCRIPTION

Figure 1:
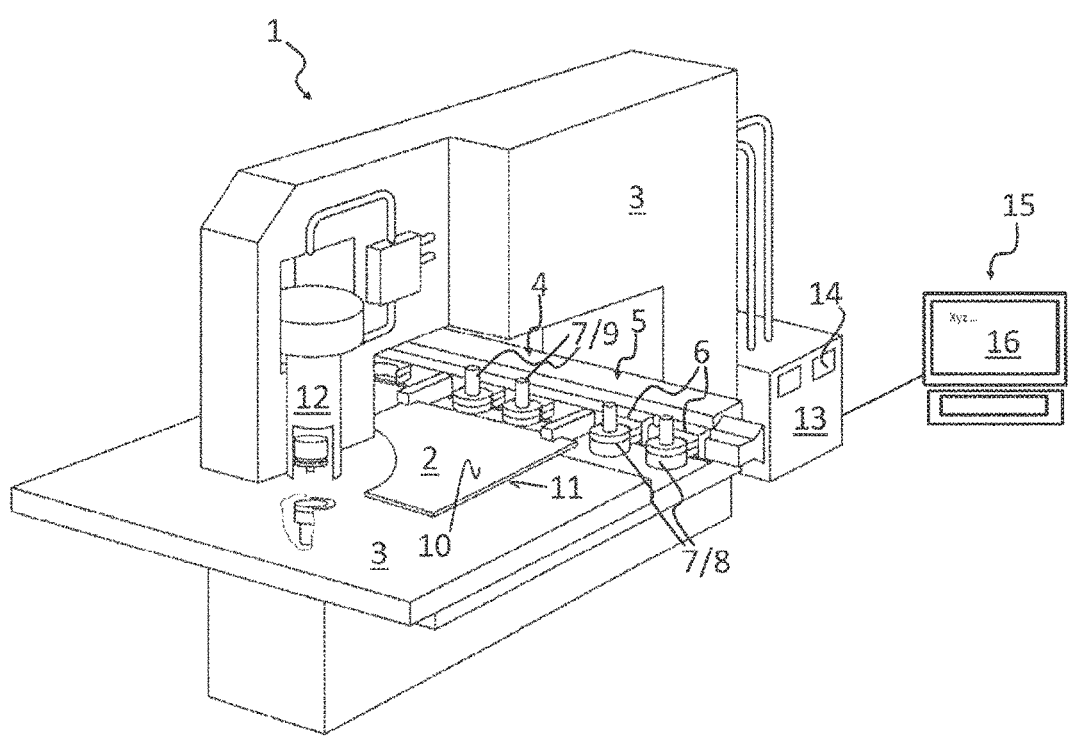
FIG. 1 shows a schematic illustration of a punching/forming machine and a computer on which a programming system for generating machining programs for the punching/forming machine is operated.

FIG. 1 shows a punching/forming machine 1 for machining a plate-like workpiece in the form of a sheet metal plate 2. The punching/forming machine 1 includes a workpiece support 3 on which the sheet metal plate 2 is positionable in a horizontal plane by a workpiece movement device 4 during machining. The punching/forming machine 1 further includes a tool magazine 5 that has multiple tooling spaces 6 in which various punching/forming tools 7 are supported.

Punching tools 8 and two or more dissimilar marking tools 9 are supported in the tooling spaces 6. The punching tools 8 are formed to produce apertures in the form of punched holes in the sheet metal plate 2. At least some of the punched holes form receptacles for insert parts that are to be inserted at a later time during a machining process. The marking tools 9 are formed to produce one or more markings in association with a receptacle based on an insertion direction or an orientation of an insert part. The marking tools 9 are configured according to marking tools that are described in German patent application publication no. DE 100 49 701 A1, the content of which is incorporated herein by reference. One marking tool 9 is suitable for marking an upper side 10 of the sheet metal plate 2, while one marking tool 9 is suitable for marking a lower side 11 of the sheet metal plate 2. The punching/forming machine 1 also includes a movable punching die (e.g., a lower tool receptacle) that is suitable for accommodating a marking tool 9 for marking the lower side 11 of the sheet metal plate 2, as described in European patent no. EP 1 502 673 B1, the content of which is incorporated herein by reference.

During machining, the punching/forming tools 7 are successively interchanged in a punching/forming unit 12 of the punching/forming machine 1, such that the sheet metal plate 2 is continuously machined by various punching/forming tools 7. Additionally, the marking tools 9 are operated to continuously machine the sheet metal plate 2 while the sheet metal plate 2 is continuously moved.

A numerical control unit 13 is provided to control the punching/forming machine 1. A machining program 14 is executed on the numerical control unit 13 and has multiple control commands. Moreover, a data processing system in the form of a computer 15 is illustrated in FIG. 1. The computer 15 has a computer program product including codes that configure a programming system 16 when the computer program product is operated on the computer 15. The programming system 16 assists a programmer in generating the machining program 14 for the punching/forming machine 1.

Figure 2:
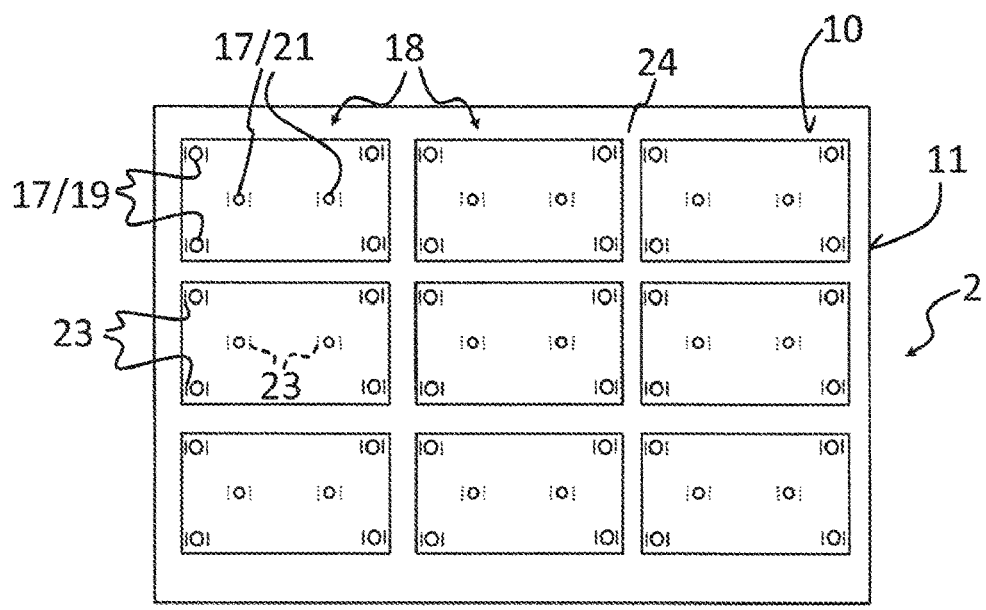
FIG. 2 shows a sheet metal plate including multiple receptacles for insert parts, where the receptacles are identified based on respective orientations and insertion directions of the insert parts.
Figure 3:
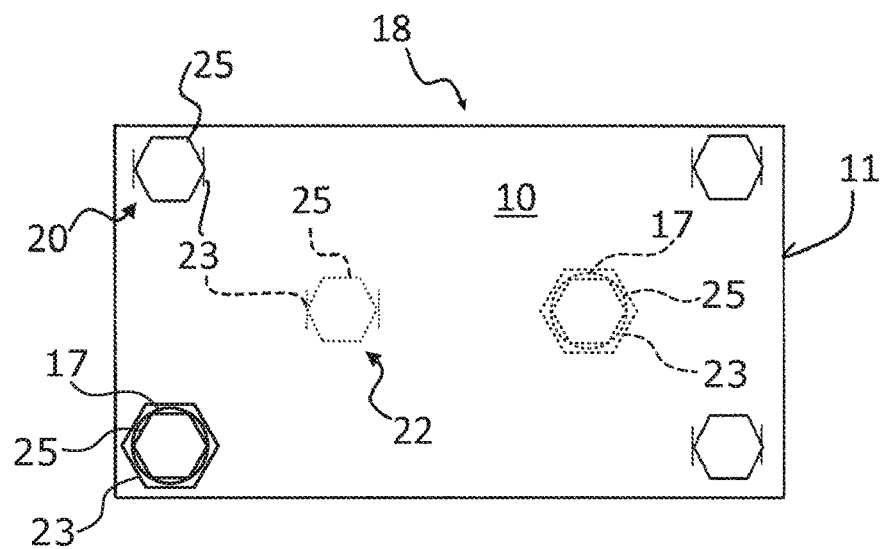
FIG. 3 shows the sheet metal plate according to FIG. 2 assembled with insert parts.

FIG. 2 illustrates a sheet metal plate 2 that has been machined (e.g., including formation of receptacles 17 for insert parts) on the punching/forming machine 1. The sheet metal plate 2 includes multiple (e.g., nine) identical sheet metal cutouts 18. Each corner region of the sheet metal cutouts 18 has one punched hole 19. Each punched hole 19 forms one receptacle 17 for an insert part to be inserted therein at a later time. In these examples, the insert part is a weld nut 20, as shown in FIG. 3. Furthermore, each center region of the sheet metal cutouts 18 has two small punched holes 21 (relative to a size of the punched holes 19) that also form receptacles 17 for insert parts that are to be inserted at a later time. In these cases, the insert parts are rivet nuts 22, as shown in FIG. 3.

Once the punched holes 19, 21 of the receptacles 17 have been produced in the sheet metal plate 2, a manner of machining the receptacles 17 depends on orientations and insertion directions. To this end, a punching tool 8 is exchanged for a marking tool 9 for marking the upper side 10 of the sheet metal plate 2. Each of the comparatively large receptacles 17 in the corner regions of the sheet metal cutouts 18 are then sequentially provided with two parallel marking lines 23 located on opposite sides of the receptacle 17. The position of the marking lines 23 on the upper side 10 of the sheet metal plate 2 indicates that the assigned insert parts are to be inserted from this side. The upper side 10 (e.g., the attachment side in this case) also indicates how the insert parts are to be oriented (e.g., indicating a location bearing side of heads of the insert parts).

The marking tool 9 for marking the upper side 10 of the sheet metal plate 2 is subsequently exchanged for another marking tool 9 for marking the lower side 11 of the sheet metal plate 2. Accordingly, two parallel marking lines 23 are provided on opposite sides of the punched holes 21 of the small receptacles 17. The marking lines 23 indicate which side (e.g., the lower side 11) the assigned insert parts are to be inserted from and accordingly which side heads of the insert parts will bear upon. Finally, the sheet metal cutouts 18 (with the exception of micro joint connections that are not shown) are cut loose from a residual grid 24 of the sheet metal plate 2.

FIG. 3 illustrates a single sheet metal cutout 18 that has been separated from the sheet metal plate 2 of FIG. 2. The sheet metal cutout 18 has been removed from the remaining residual grid 24, and the insert parts have been inserted into the receptacles 17. One weld nut 20 has been inserted into each of the punched holes 19 of the corner regions from the upper side 10 of the metal sheet cutout 18. Accordingly, a hexagonal head 25 of the weld nut 20 is disposed on the upper side 10 such that the hexagonal head 25 bears on and is welded to the upper side 10. One rivet nut 22 has been inserted into each of the two punched holes 21 from the lower side 11 of the sheet metal cutout, which is not visible in FIG. 3. Accordingly, hexagonal heads 25 of the rivet nuts 22 bear on the non-visible lower side 11.

Machining as described of the sheet metal plate 2 is performed on the punching/forming machine 1 by executing the machining program 14 that has corresponding control commands on the numerical control unit 13. For example, the machining program 14 has multiple control commands by which punched holes are produced in the sheet metal plate 2 at three different example positions A, B, C. The control commands include a mode-on control command that sets the numerical control to a machining mode that is based on orientations and insertion directions. For example, the mode-on control command includes multiple parameters, such as a tooling space 6 corresponding to a punching tool 8 to be used, a spacing between marking lines 23 and a punched hole (e.g., 5 mm), and a length of the marking lines 23 (e.g., 12 mm). The side 10, 11 of the sheet metal plate 2 on which the marking lines 23 are incorporated is determined by the indication of the tooling space 6 of the punching tool 8 to be used, since a marking tool 9 for marking the upper side 10 or the lower side 11 of the sheet metal plate 2 is disposed at the tooling space 6. According to two subsequent commands that include only coordinates of the positions A, B, two parallel marking lines 23 (e.g., or alternatively, two or more pairs of parallel marking lines 23) are marked on the upper side 10 of the sheet metal plate 2 on opposite sides of punched holes located at the coordinates. The two subsequent commands may then be ended and followed by a mode-off command.

The mode-off command may be immediately followed by a mode-on command that includes other parameters. According to a subsequent command that includes coordinates of position C, two parallel marking lines 23 (e.g., or alternatively, two or more pairs of parallel marking lines 23) are marked on the lower side 11 of the sheet metal plate 2 on opposite sides of a punched hole at the position C. Subsequently, the mode-on command is ended by another mode-off command.

A machining program 14 of this type may be generated on the programming system 16 that is carried out on the computer 15 that is shown in FIG. 1. The programming system 16 generates the machining program 14 in a largely automatic manner. The control commands are automatically generated based on predefined positions and diameters of the receptacles 17 for the insert parts, spacings between marking lines 23 and the receptacles 17, lengths of the marking lines 23, and insertion directions and orientations of the insert parts associated with the respective receptacles 17. A programmer may predefine or select predefined values via an input module. Moreover, the programming system 16 may establish a tooling plan for the machine 1 so that the required punching tools 8 installed in respective tooling spaces 6 are correctly identified for machining.

In some embodiments, machining of a sheet metal plate 2 may also be performed on a laser processing machine or on a punching/forming machine that includes a laser machining unit. For such embodiments, receptacles 17 may be identified by a laser processing beam.

A number of embodiments have been described. Nevertheless, it will be understood that various modifications may be made without departing from the spirit and scope of the present disclosure. Accordingly, other embodiments are within the scope of the following claims.

What is claimed is:

1. A method for machining a plate-shaped workpiece with a processing machine, the method comprising:
    forming a round receptacle in the plate-shaped workpiece for an insert part having a non-round outer shape; and
    machining a marking adjacent the round receptacle based on an orientation at which the insert part is to be inserted into the round receptacle on a side of the plate-shaped workpiece from which the insert part is to be inserted into the round receptacle and on which the insert part is to bear,
    wherein the marking is provided as a non-round depression that encircles the round receptacle,
    wherein the marking is positioned outside of the non-round outer shape of the insert part, and
    wherein the marking is adapted to the non-round outer shape of the insert part.

2. The method of claim 1, wherein the plate-shaped workpiece comprises a sheet metal plate.

3. The method of claim 1, wherein the insert part comprises a weld nut or a rivet nut.

4. The method of claim 1, wherein the plate-shaped workpiece is disposed horizontally during machining of the marking, the method further comprising machining the marking on an upper side of the plate-shaped workpiece.

5. The method of claim 1, wherein the plate-shaped workpiece is disposed horizontally during machining of the marking, the method further comprising machining the marking on a lower side of the plate-shaped workpiece.

6. The method of claim 1, further comprising punching an aperture in the plate-shaped workpiece to form the round receptacle.

7. The method of claim 1, wherein the round receptacle is a first round receptacle, the insert part is a first insert part, the marking is a first marking, the orientation is a first orientation, and the side is a first side, the method further comprising:
    forming one or more second round receptacles in the plate-shaped workpiece respectively for one or more second insert parts; and
    machining one or more second markings respectively adjacent the one or more second round receptacles based on one or more second orientations at which the one or more second insert parts are to be inserted into the one or more second round receptacles and one or more second sides of the plate-shaped workpiece form which the one or more second insert parts are to be inserted into the one or more second round receptacles.

8. The method of claim 1, further comprising running a machining program comprising control commands that control the forming of the round receptacle and the machining of the marking.

9. The method of claim 8, further comprising running the machining program on a numerical control unit of the processing machine.

10. The method of claim 1, wherein the processing machine comprises at least one of a punching device, a forming device, and a combined punching and forming device.

* * * * *